United States Patent [19]

Bachand et al.

[11] Patent Number: 5,325,062

[45] Date of Patent: Jun. 28, 1994

[54] APPARATUS AND METHOD FOR DETECTION OF LATENT FAULTS IN REDUNDANT SYSTEMS

[75] Inventors: Gerard E. Bachand, Cherry Valley; Peter A. Goodwin, Wayland, both of Mass.

[73] Assignee: Sequoia Systems, Inc., Marlboro, Mass.

[21] Appl. No.: 911,510

[22] Filed: Jul. 10, 1992

[51] Int. Cl.$^5$ ............................................. G01R 31/02
[52] U.S. Cl. ...................... 324/537; 324/500; 324/527; 324/133
[58] Field of Search ............... 324/500, 527, 537, 548, 324/549, 602, 609, 133, 550

[56] References Cited

U.S. PATENT DOCUMENTS

| | | | |
|---|---|---|---|
| 3,912,879 | 10/1975 | Lawson | 324/549 X |
| 4,025,845 | 5/1977 | Lhommelet et al. | 324/537 |
| 4,382,225 | 5/1983 | Peltz | 324/133 X |
| 4,517,555 | 5/1985 | Marsocci et al. | 324/133 X |
| 4,527,118 | 7/1985 | Koslar | 324/133 |
| 4,799,019 | 1/1989 | Cooley et al. | 324/546 |
| 4,881,028 | 11/1989 | Bright | 324/133 X |

*Primary Examiner*—Kenneth A. Wieder
*Assistant Examiner*—Glenn W. Brown

*Attorney, Agent, or Firm*—Wolf, Greenfield & Sacks

[57] ABSTRACT

Apparatus and method are provided for fault detecting in an electrical system such as a redundant or fault-tolerant system. A current receiving device connected in shunt or in series in such a system draws electric current from the electrical system being monitored. During normal operation, while current is still flowing properly through the system being monitored, an appropriate indication such as a continued series of pulses is generated, which is interpreted as indicating proper operation. If that current flow is cut off, indicating a fault condition, then the apparatus and method provide an appropriate signal (such as cutoff of the series of pulses) to a communication system which provides an appropriate indication to an external location. The current receiving device can be a relaxation oscillator together with another device which can be a pulse generator, an L-C energy transfer arrangement, a bridge circuit including an inductor, a two-winding inductor or a capacitor. The latter such device can be connected in shunt or in series with the electrical system being monitored. The relaxation oscillator is connected in shunt with the system being monitored. The communication device can, for example, be a photoemitter in combination with a photodetector, or could alternatively be a two-winding transformer.

36 Claims, 7 Drawing Sheets

APPARATUS AND METHOD FOR DETECTION OF LATENT FAULTS IN REDUNDANT SYSTEMS

FIELD OF THE INVENTION

The present invention relates to fault detecting in electric circuits and electric components such as redundant or fault-tolerant systems, and furthermore relates to electric circuits and electric components such as redundant or fault-tolerant systems with provision for fault detecting.

BACKGROUND OF THE INVENTION

In the field of fault-tolerant systems, it has been a general practice to employ redundant circuitry. Thus, if one part of a redundant system fails, the other part of the redundant system is still available to perform the intended function of the system. Although such devices have served the purpose, they have not proved entirely satisfactory under all conditions of service because latent faults can develop in a portion of a redundant system that is not then in use. If, for example, in a redundant power source, one portion of the redundant system is currently in use while the other portion is serving as an unused backup, any error or fault condition in the backup portion would not normally be detected during system operation unless and until the backup portion is put into use. Since that would generally only happen when the first portion of the system failed, the presence of a latent fault could result in a catastrophic failure of the entire system. Thus, if one portion of a redundant system fails, and the backup portion of the redundant system already had an undiscovered fault, a failure of the entire system would result. Such a failure would defeat the purpose of redundancy. Latent faults essentially rob redundant systems of the advantages of uninterrupted operation for which such systems had been designed.

The performance of fault-tolerant systems is dependent upon redundant operations and circuitry. For example, critical power subsystems are supported by more than one energy path. However, whenever one path provides total support while the other path is unused, a small but nonetheless real possibility exists that an unknown, undetected fault exists in the path not currently in use. If the primary support channel fails subsequently, then this latent fault would cause failure of some or all of the load circuits downstream, resulting in the cessation of operation due to loss of system integrity.

One such prior art redundant power system is illustrated in FIG. 1. A critical load element 11, such as a power converter, is supported by two DC sources 13 and 15 via respective duplicate buses 17 and 19. Bus 17 includes isolation diodes 21 and 23. Bus 19 includes isolation diodes 25 and 27. Each isolation diode is connected at one electrode to load 11 and thus to the respective opposite bus 17 or 19. Isolation diodes 21, 23, 25 and 27 thereby permit load 11 to obtain power from one such bus or the other, and also protect against overload on one bus if the other bus fails. It is probable that one of the two sources 13 and 15 produces a higher voltage than the other, so that the higher voltage bus will then always be the one actually supporting load 11.

Bus 17 is also provided with protective fuses 29 and 31, while bus 19 is provided with protective fuses 33 and 35. Each fuse 29, 31, 33 and 35 is connected in series to a respective diode 21, 23, 25 or 27. Thus, diode 21 is connected between fuse 29 and load 11. Diode 23 is connected between fuse 31 and load 11. Diode 25 is connected between fuse 33 and load 11. Diode 27 is connected between fuse 35 and load 11. As can be seen in FIG. 1, the cathodes of diodes 21 and 25 are connected to each other and to load 11. Also, the anodes of diodes 23 and 27 are connected to each other and to load 11.

Incorporation of diodes 21, 23, 25 and 27, and of fuses 29, 31, 33 and 35, into respective buses 17 and 19, while providing valuable protection to the system of FIG. 1, also each provide a source of a possible failure. Any one or more of diodes 21, 23, 25 and 27 could fail open or could fail short-circuited. Also, any one or more of fuses 29, 31, 33 and 35 could fail open. Thus, there are 12 possible fault conditions for the apparatus of FIG. 1. Because redundant buses 17 and 19 are provided in FIG. 1, if a conducting diode or the fuse connected thereto fails open then the other bus will provide power to the load. While operation would continue uninterrupted, no indication of the failure would be recognized by the system of FIG. 1. Furthermore, if, for example, diode 25 fails while bus 17 is in use and bus 19 is serving as a back-up, that failure would likely go undetected. If a failure then occurs on bus 17, and bus 19 is already crippled by a disabling failure, the results could be catastrophic. Such a situation would deprive the user of an important benefit of utilizing a redundant or fault-tolerant system, and the ability of uninterrupted operation notwithstanding any presence of fault conditions.

If one or more of diodes 21, 23, 25 and 27 fails shorted, then the fault may propagate further. For example, in a telecommunications environment where equipment is connected to a central office battery via redundant building distribution buses, an external circuit exists between the two positive supply buses, and between the two negative supply buses of such a system. If that system is configured as shown in FIG. 1, and if, for example, diode 23 fails shorted, and if voltage source 15 has a higher voltage output than does voltage source 13, then a line overload may occur because source 15 will attempt, through the sneak path created by shorted diode 23 and the connections between the external distribution systems, to support any other loads connected to voltage source 13. As a result, either or both of fuses 31 and 35 may then clear and the system fail.

SUMMARY OF THE INVENTION

Accordingly, an object of the present invention is to provide apparatus and a method for detecting the presence of latent faults in electrical systems.

Another object of the present invention is to provide apparatus and a method for detection of latent faults in redundant or fault-tolerant systems such as redundant power systems.

Still other objects of the present invention are to provide apparatus and a method for detecting the presence of latent faults in an electrical system that do not affect whether components under test are actively engaged in power delivery, which can test reliably under powered as well as unpowered conditions, and which can provide a fault indication if the detecting apparatus itself fails.

A further object of the present invention is to provide apparatus and a method for rapid detection and indication of otherwise latent faults in electrical systems such as redundant power systems.

Yet other objects of the present invention are to provide apparatus and a method for detecting open-circuit faults in power-handling components connected in series between a DC power source and a load, which apparatus and method have no effect on the power-delivering properties of the components being tested, can continue to test those components whether or not they are actively participating in the delivery of power to the load, are capable of being utilized in redundant power delivery systems, and can provide fault signalling using circuit closure (e.g., a phototransistor) or voltage-source (e.g., a transformer winding) topologies, wherein the signalling source may be isolated to any desired degree from the circuit elements being tested.

Still further objects of the present invention are to provide apparatus and a method capable of providing redundant fault signalling if desired, which utilizes as its operating power the voltages available in the circuits to be tested, are relatively independent of the magnitudes of those voltages, and which can indicate a fault if the test circuit itself fails.

Briefly, these and other objects of the present invention are accomplished by apparatus, and a method, for fault detection in an electrical system that includes at least one electrical component that is capable of failure. The apparatus and method passes a first signal through the electrical component; successful passage of this first signal results in generation of a second signal indicative of successful operation of the electrical system, or a no-fault condition. The first signal is passed through the at least on electrical component on a loop or electrical circuit path that includes the generator for the first signal, the generator for the second signal, and the at least one electrical component. If the at least one electrical component has not failed open, then the first signal can pass through the loop and return to its source. This permits the generator of the second signal to produce the second signal, indicating proper operating condition of the system. The first signal generator can for example be a pulse generator, an L-C energy transfer arrangement, a bridge circuit including an inductor, a two-winding inductor or a capacitor. The first signal generator can be connected in shunt or in series with the electrical system being monitored. The first signal generator can also include a device drawing electric current from the portion of the electrical system to be monitored. If that current flow is cut off, indicating a fault condition, then the first signal (and thus the second signal) would not be generated. The current drawing device can be a relaxation oscillator, and that relaxation oscillator would then provide its output to the pulse generator, L-C energy transfer arrangement, bridge circuit including an inductor, two-winding inductor, or capacitor mentioned above. The second signal generator can provide the second signal to an external location for easier monitoring. The generator of the second signal can for example be an optical isolator, a two-winding transformer, a wireless transmitter and receiver, or other suitable means.

Other objects, advantages and novel features of the invention will become apparent from the following detailed description of the invention when considered in conjunction with the accompanying drawings.

DETAILED DESCRIPTION

Figure 1:
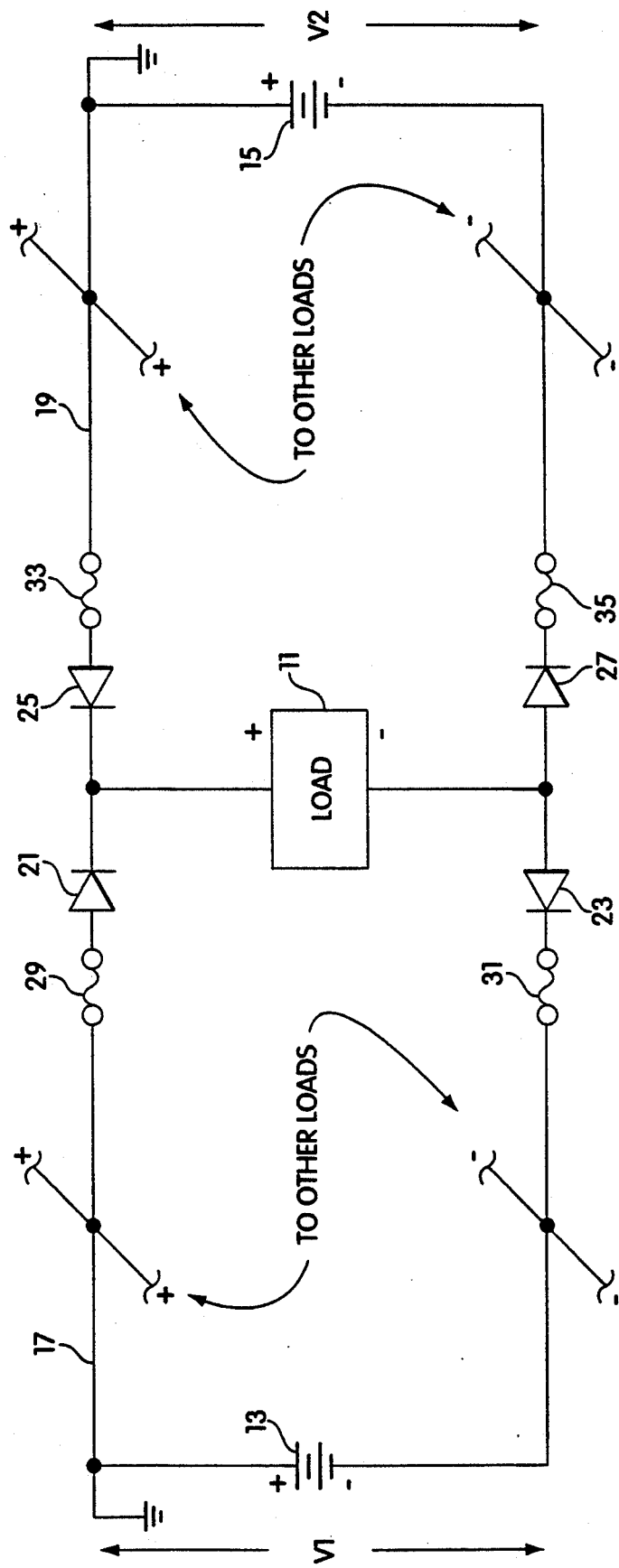
FIG. 1 is a schematic representation of a prior art redundant power system for redundant power delivery to a load.
Figure 2:
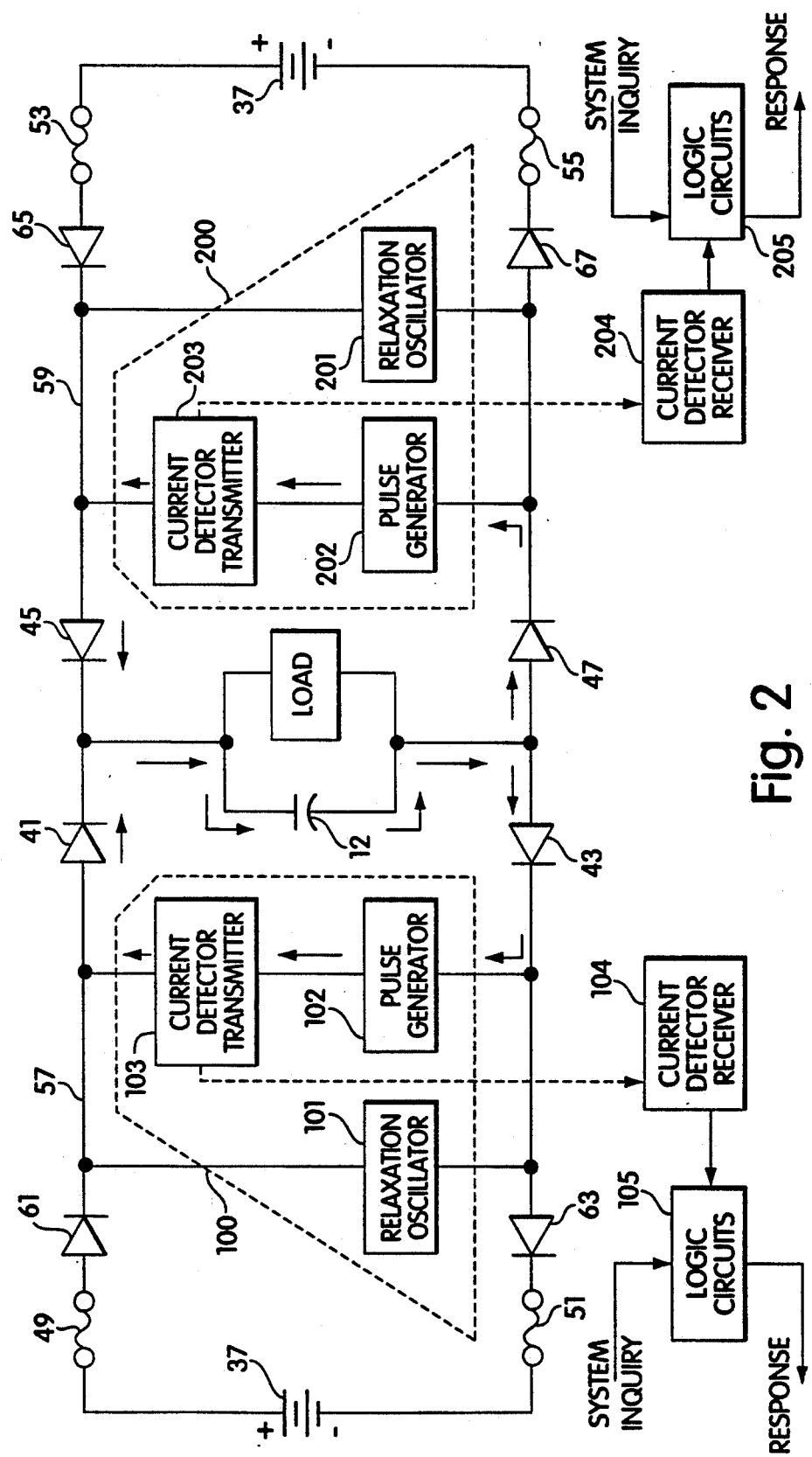
FIG. 2 is a block diagram of one embodiment of a fault monitoring and detecting system for a redundant power system according to the present invention.

Referring now to the drawings, wherein like reference characters designate like or corresponding parts throughout the several views, there is shown in FIG. 2 a generic scheme for detecting latent faults in a redundant power system using shunt-connected testing Alternatively, a series implementation may be employed such as that shown in FIG. 12 discussed below. Load 11, like load 11 of FIG. 1, has been included in the system of FIG. 2. That system also includes voltage sources 37 and 39 respectively corresponding to voltage sources 13 and 15. The system of FIG. 2 includes two redundant power buses 57 and 59, each with its respective voltage source 37 and 39. Incorporated into bus 57 are protective fuse 49, isolation diode 61, isolation diode 41, isolation diode 43, isolation diode 63 and protective fuse 51. Incorporated into bus 59 are protective fuse 53, isolation diode 65, isolation diode 45, isolation diode 47, isolation diode 67 and protective fuse 55. The diodes 41, 43, 45, 47, 61, 63, 65 and 67 of FIG. 2 are oriented to permit current flow through the respective buses 57 and 59, from the respective sources 37 and 39 through the load 11 and then returned to complete the circuit. Load 11 is furthermore provided with a bypass or shunt capacitor 12. Capacitor 12 serves as a high-frequency bypass element that bypasses load 11 so that the pulses generated by respective test circuits, in a manner discussed below, do not disrupt normal operation of the load. Capacitor 12 does not affect provision of DC power to load 11.

Test circuit 100 is shunt connected to bus 57, and test or interrogation circuit 200 is shunt connected to bus 59. Test circuit 100 includes relaxation oscillator 101, pulse generator 102 and current detector/transmitter 103. Test circuit 200 includes relaxation oscillator 201, pulse generator 202 and current detector/transmitter 203. Pulses from respective pulse generators 102 and 202 pass therefrom in the respective directions indicated by the arrows in FIG. 2 and then each return to its respective pulse generator to complete the circuit.

In test circuit 100, relaxation oscillator 101 draws power from the input side of bus 57, triggering pulse generator 102 to emit a pulse. This pulse passes through diodes 41 and 43 being tested, as well as bypass capacitor 12. If neither diode 41 nor diode 43 has failed open, then transmitter 103 detects the pulse and transmits its detection of the pulse to receiver 104. This transmission can be in the form of a signal (such as a pulse) indicating a "no fault" condition. Receiver 104 in turn controls logic circuitry 105, which may be tested by the host system (not shown). Isolation diodes 61 and 63 prevent pulses, from pulse generator 102, from passing through voltage source 37.

Likewise, during normal operation of the system of FIG. 2, relaxation oscillator 201 draws power from the input side of bus 59, thus triggering pulse generator 202 to emit a pulse. This pulse passes through diodes 45 and 47 being tested, as well as bypass capacitor 12. If neither diode 45 nor diode 47 has failed open, then transmitter 203 detects the pulse and transmits its detection of the pulse to receiver 204. This transmission can be in the form of a signal (such as a pulse) indicating a "no fault" condition. Receiver 20 in turn controls logic circuitry 205 which may be tested by the host system (not shown). Isolation diodes 65 and 67 prevent pulses, from pulse generator 202, from passing through voltage source 39.

Transmitter 103 with receiver 104, and transmitter 203 with receiver 204, each provide a capability for remote detection of any faults of the redundant power system of FIG. 2, thereby isolating the power buses from the detection apparatus. If fuse 49 or fuse 51 fails open, then relaxation oscillator 101 will not operate, pulse generator 102 will not generate a pulse, and no pulse will be received by transmitter 103 and relayed to receiver 104. Similarly, no pulse will be relayed to receiver 104 by transmitter 103 if one or more of diodes 61 and 63 fail open. If diode 41 or 43 fails open, then any pulse current from pulse generator 102 to transmitter 103 has no return path to pulse generator 102; accordingly, transmitter 103 will not detect current pulses and will not relay any pulses to receiver 104. Similarly, if one or more of fuses 53 and 55 or diodes 65 and 67 fails open, relaxation oscillator 201 would not be able to draw power from bus 59, and thus could not trigger pulse generator 202 to generate any pulses. If fuse 53 or fuse 55 fails open, or if diode 65 or diode 67 fails open, then relaxation oscillator 201 will not operate, pulse generator 202 will not generate a pulse, and no pulse will be received by transmitter 203 and relayed to receiver 204. Also, if one or more of bus 59 diodes 45 and 47 fail open then any pulse current from pulse generator 202 to transmitter 203 has no return path through capacitor 12 or load 11 to pulse generator 202, so that transmitter 203 will not detect current pulses and will not relay any pulses to receiver 204.

Transmitter 103 and receiver 104 isolate power bus 57 from the detection apparatus of logic 105. Also, transmitter 203 and receiver 204 isolate power bus 59 from the detection apparatus of logic 205.

Figure 3:
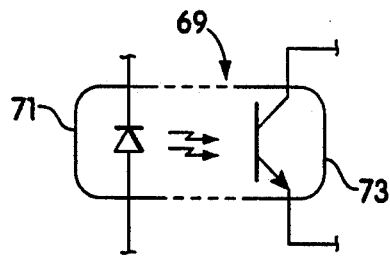
FIG. 3 is a schematic representation of one embodiment of a transmitter and receiver that can be utilized in the apparatus of FIG. 2.

One embodiment of the coupler or current detector formed by transmitter 103 and receiver 104, or by transmitter 203 and receiver 204, is shown in FIG. 3. FIG. 3 illustrates an optoisolator or optical coupler 69 such as is well known in the art. Optoisolator 69 includes a photoemitter 71 such as a light emitting diode (LED), and a photoreceptor or photodetector 73 such as a phototransistor. Photoemitter 71 can be utilized as transmitter 103 or 203, and photoreceptor 73 can be utilized as receiver 104 or 204. Optoisolator 69 thereby provides means for detecting the flow of current through the components of FIG. 2 to be so tested. As discussed above, optoisolator 69 also isolates the power bus from the fault detection apparatus. Alternatively, any sort of optoisolator, optical coupler, optical isolator, photoisolator or phototransmitter/photoreceiver combination could be so utilized.

Figure 4:
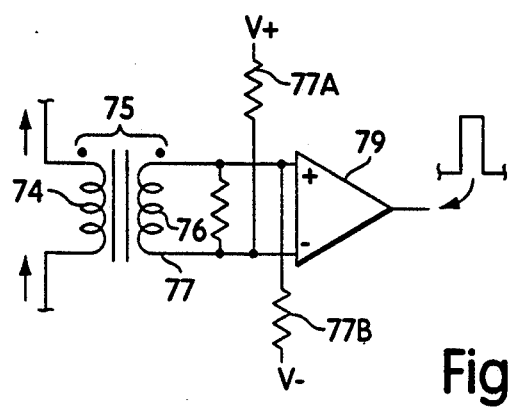
FIG. 4 is a schematic representation of another embodiment of a transmitter and receiver that can be utilized in the apparatus of FIG. 2.

FIG. 4 shows an alternative implementation of transmitter 103 (or 203) and receiver 104 (or 204). FIG. 4 illustrates the combination of a current transformer 75, voltage-ranging resistor 77 and receiver amplifier 79. Current pulses such as from pulse generator 102 or 202 are applied to the primary side 74 of transformer 75. The transformer action causes a current pulse to be generated in the secondary windings 76 of transformer 75 and resistor 77 converts the current pulse from secondary winding 76 to a voltage pulse. Resistors 77A and 77B normally bias amplifier 79 into the "off" or "no pulse" condition, but the voltage pulse applied to amplifier 79 overcomes the bias applied by resistors 77A and 77B, resulting in an output pulse at the output of amplifier 79. Alternatively, if hardwire electrical isolation is not required, then a simple current-sensing resistor could be employed in FIG. 4 in lieu of transformer 75.

Figure 5:
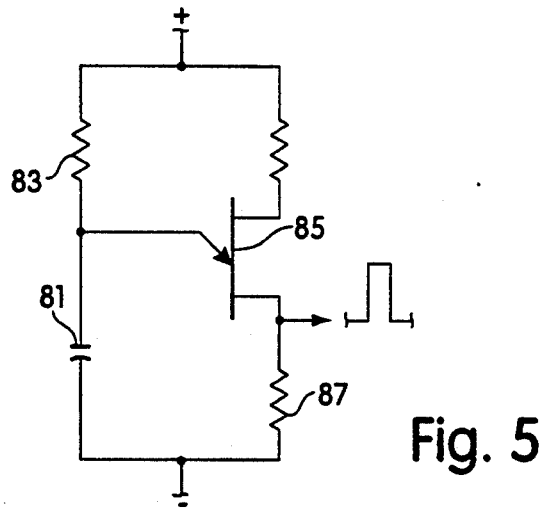
FIG. 5 is a schematic representation of one embodiment of a relaxation oscillator that can be utilized in the apparatus of FIG. 2.

FIG. 5 illustrates one embodiment of relaxation oscillator 101 and of relaxation oscillator 201. In FIG. 5, capacitor 81 is charged via resistor 83. The charge on capacitor 81 increases until the voltage across capacitor 81 reaches the unijunction trigger voltage (determined by the interbase voltage and intrinsic standoff ratio parameters of the device). At this point, unijunction transistor (UJT) 85 switches to its low-impedance state, discharging capacitor 81 through resistor 87, thereby developing an output voltage pulse across resistor 87. Once capacitor 81 has discharged, UJT 85 reverts to its high-impedance state, and the process repeats. Thus, the apparatus of FIG. 5 can generate a sequence of output pulses whose inter-pulse interval is very long relative to the duration of each pulse.

Figure 6:
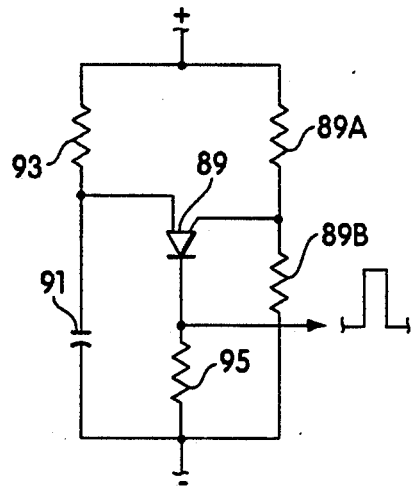
FIG. 6 is a schematic representation of another embodiment of a relaxation oscillator that can be utilized in the apparatus of FIG. 2.

An alternative relaxation oscillator is illustrated in FIG. 6. While in FIG. 5 a UJT 85 was utilized, FIG. 6 instead utilizes a programmable UJT (PUT) device 89. In FIG. 6, capacitor 91 is charged through resistor 93. The charge on capacitor 91 increases until the voltage across capacitor 91 reaches the unijunction trigger voltage (set by the voltage-divider resistors 89A and 89B). At this point, PUT 89 switches to its low-impedance state, discharging capacitor 91 through resistor 95, thereby developing an output voltage pulse across resistor 95. Once capacitor 91 has discharged, PUT 89 reverts to its high-impedance state, and the process repeats. In this manner, the apparatus of FIG. 6 generates a sequence of output pulses whose inter-pulse interval is very long relative to the duration of each such pulse.

Configurations similar to those of FIG. 5 and of FIG. 6, and suitable for the purpose, may be found in *SCR Manual*, 5th Ed. from General Electric Company, Syracuse, N.Y., 1972, pp. 98–112.

Various alternative embodiments are illustrated in FIGS. 7–12. For convenience and simplicity of illustration, FIGS. 7 and 9–12 each show only half of a redundant power system in detail, with only the fault monitoring and detecting system for that half. Nonetheless, it should be understood that FIGS. 7–12 each relate to a fully redundant power system, with a corresponding pair of fault monitoring and detecting systems therefor.

Figure 7:
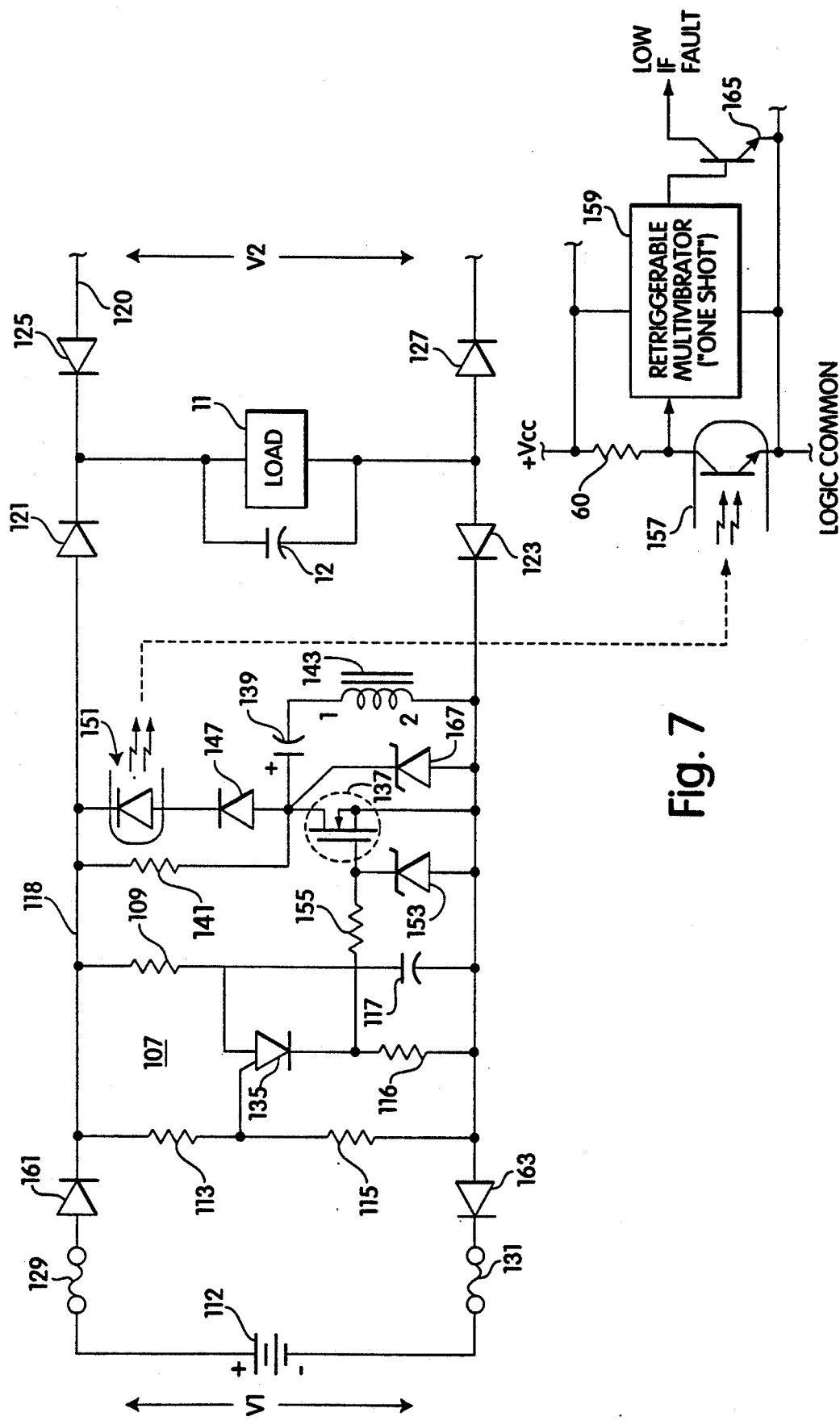
FIG. 7 is a schematic representation of another embodiment of a fault monitoring and detecting system installed in one portion of a redundant power system according to the present invention.

An alternative shunt-connected implementation, utilizing L-C energy transfer, is illustrated in FIG. 7. For convenience, the majority of one of the two redundant power supply buses, such as is shown in FIG. 2, is shown in FIG. 7. Nonetheless, it should be understood that a shunt structure, corresponding to that to the left of load 11, is also to be utilized to the right of load 11, assuming the presence of an additional voltage source. FIG. 7 illustrates a shunt-connected implementation of a latent-fault detector.

As in FIG. 2, the redundant power system of FIG. 7 includes a voltage source 112 and a bus 118 connecting that source to a load 11. Capacitor 12 bypasses load 11. Bus 118 is provided with fuses 129 and 131. Bus 118 is also provided with appropriately directed fault isolation diodes 121, 123 and pulse isolation diodes 161, 163. In addition to preventing the current pulses generated by FET 137 a described below from passing directly through power supply 112, diodes 161 and 163 also isolate the pulses generated by FET 137 from the voltage difference |V1-V2| between the two buses 118 and 120. For example, if bus 120 voltage V2 is greater than bus 118 voltage V1, then diode 121 would normally be back-biased by a voltage difference of |V1-V2| if diodes 161 and 163 were absent. Accordingly, without diodes 161 and 163, the test circuit of FIG. 7 would then have to overcome the reverse voltage across diodes 121 and 123 in order to test the conduction status of those diodes.

The relaxation oscillator 107 of FIG. 7 includes resistor 109, resistor 111, resistor 113, resistor 115, capacitor 117 and PUT 135. Relaxation oscillator 107, like the relaxation oscillator of FIG. 6, generates low duty cycle. positive-going pulses at the cathode of the PUT which are applied to the gate electrode of FET 137. Field effect transistor (FET) 137 is thus normally in its "off" or high impedance state. While FET 137 is off, capacitor 139 acquires a charge corresponding to the bus voltage V through resistor 141 and inductor 143, with the left plate (as illustrated) of capacitor 139 being positive with respect to its right plate. Pulses generated by PUT 135 drive FET 137 into conduction, thereby shorting the positive plate of capacitor 139 to supply line 145. Since capacitor 139 is charged to a voltage of V volts, terminal 1 of inductor 143 is driven V volts more negative than the negative side or rail 145 of bus 118. As a result, the energy stored in capacitor 139 is transferred to inductor 143 as current flowing through inductor 143 from terminal 2 to terminal 1. Shortly thereafter, FET 137 is switched off at the end of that pulse from PUT 135. An inductive flyback pulse resulting from the energy stored in inductor 143 is generated as terminal 1 of the inductor becomes more positive than terminal 2. The current pulse travels through capacitor 139, diode 147, photoemitter 151, diode 121, shunt capacitor 12, diode 123 and thence back to inductor 143. In response, photoemitter 151 emits a brief pulse of light. In this configuration, zener diode 153 provides overvoltage protection to the gate of FET 137, and resistor 155 limits to a safe value the current which flows through diode 153. Zener diode 167 provides an alternate path to dump the current in inductor 143 if any element in the normal discharge path from the inductor fails open. The "on" or conduction time of FET 137 is set so that the product of the bus 118 voltage and FET 137 conduction time will always be less than the volt second storage characteristic of inductor 143. The pulse of light emitted from photoemitter 151 is provided to photoreceptor 157 such as would be the case with respective transmitter 103 or 203 and receiver 104 and 204 of FIG. 2. Photoemitter 151 and photoreceptor 157 together constitute an optical coupler. In response, the output of photoreceptor 157, which is normally pulled "high" by resistor 60, is grounded. The ground signal is applied to retriggerable multivibrator (or one-shot) 159 which runs continuously during proper operation of bus 118. One shot 159 will time out and produce a "high" output if it is not retriggered. Accordingly, light pulses from photoreceptor 157 must continue to be provided to one-shot 159 for a continued low-level output therefrom. The output of one-shot 159 may be sampled by system operating software via transistor 165.

When the power supply is operating properly, as described above, FET 137 generates a series of test current pulses. These pulses pass from diode 147 through photoemitter 151 and thence back to inductor 143 via diode 121, capacitor 12 and diode 123.

Operation of the apparatus of FIG. 7 would, however, change in the event of a failure of one or more of the components 121, 123, 129, 131, 161, 163 of bus 118. If one or more of fuses 129 and 131 and diodes 161 and 163 fail open, then no operating power is provided to relaxation oscillator 107, so that no current pulses would be provided to phototransmitter 151. If one or both of diodes 121 and 123 fail open, then the current path for the pulses from FET 137 is broken, and photoemitter 151 would generate no light pulses. In either situation, one-shot 159 times out. A low output from transistor 165, resulting from timing out of one-shot 159, would indicate a fault condition on bus 118. Alternatively, should photoemitter 151 fail as an open or a short, no light impulse would be generated therefrom, so that one-shot 159 would time out.

Thus, all of the components of bus 118, all the components of relaxation oscillator 107, FET 137 and all components connected thereto, and photoemitter 151 must be functionally operable in order to generate the pulses to retrigger one-shot 159.

Figure 8:
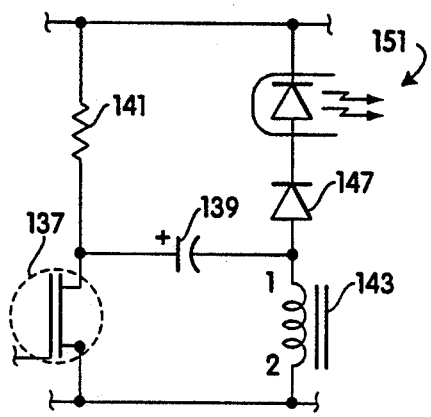
FIG. 8 illustrates a portion of still another embodiment of a fault monitoring and detecting system according to the present invention, particularly showing a schematic representation of circuitry that can be substituted for a corresponding portion of the circuitry of FIG. 7.

An alternate configuration of part of the energy-storage portion of FIG. 7 is shown in FIG. 8. Zener diode 167 is not included in FIG. 8. Also, capacitor 139 is now connected between FET 137 and diode 147, instead of diode 147 being connected directly to the output of FET 137 as in FIG. 7. Otherwise, the configuration of FIG. 8 is identical to that of FIG. 7. In FIG. 7, when inductor 143 "flies back" or discharges upon the turn-off of FET 137, the voltage accumulated across capacitor 139 is added to that developed by the discharge of inductor 153. This addition does not occur in the configuration of FIG. 8. As a result, in FIG. 8, the discharge current is maintained for a shorter period of time. This means that the configuration of FIG. 8 is less tolerant of wide variations in bus 118 voltage V1, so that a higher-performance optical isolator (photoemitter 151 and photoreceptor 157) is required. Therefore, the configuration of FIG. 7 is preferred to that of FIG. 8.

Figure 9:
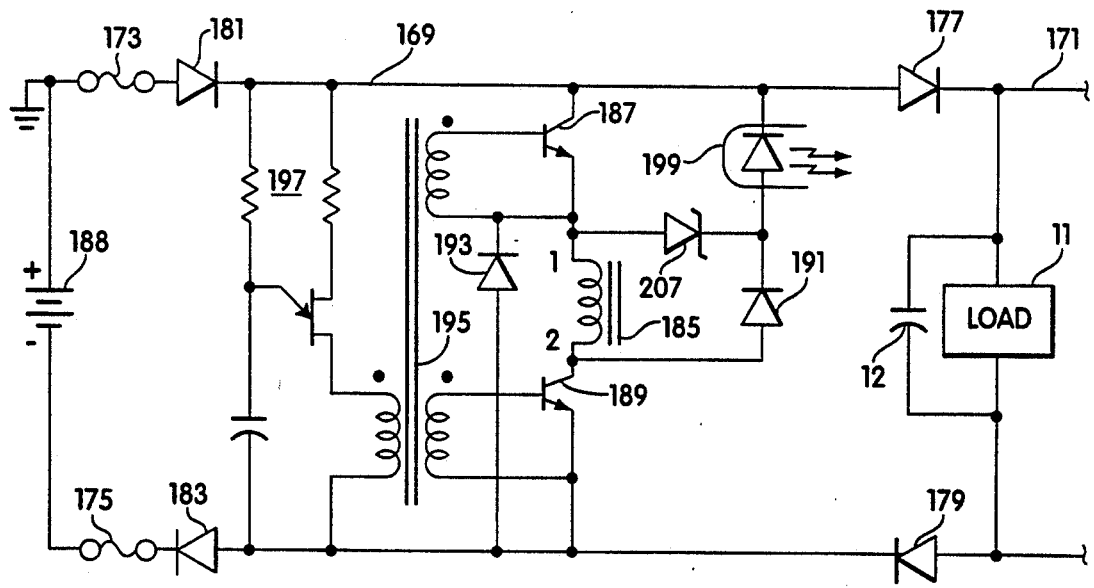
FIG. 9 is a schematic representation of a portion of a redundant power system with a further embodiment of a fault detecting and monitoring system according to the present invention incorporated therein.

Other shunt circuit implementations are possible. For example, FIG. 9 shows a shunt-connected two-transistor implementation. FIG. 9 shows redundant buses 169 and 171 which provide redundant power to load 11. As with FIG. 7, bus 169 includes fuses 173 and 175, and diodes 177, 179, 181 and 183, all to be monitored. FIG. 9 also shows a single-winding inductor 185 in a bridge circuit which also includes bipolar transistors 187 and 189 and diodes 191 and 193. Transistors 187 and 189 are turned on and off simultaneously by transformer 195. Transformer 195 is driven by relaxation oscillator 197 which has a similar configuration and operation to that of the relaxation oscillator of FIG. 5, except that transformer 195 is utilized in FIG. 9 in lieu of resistor 87 and the output line of FIG. 5. Transistors 187 and 189 are turned on by a pulse generated by oscillator 197 and coupled through transformer 195 to the bases of transistors 187 and 189. While transistors 187 and 189 are turned on, current flows from the positive side of source 188 through diode 181, transistor 187, inductor 185, transistor 189, diode 183 and thence to the negative side of source 188. When transistors 187 and 189 are switched off by relaxation oscillator 197, stored energy in inductor 185 is dumped through diode 191, photoemitter 199, diode 177, bypass capacitor 12, diode 179, diode 193, and back to inductor 185; in this manner, a pulse is generated at photoemitter 199. If one or more of diodes 181 and 183 fail open, then relaxation oscillator 197 cannot produce its usual output signal. If any of the other components to be tested (particularly diodes 177 and 179) are open, then zener diode 207 will snub inductor 185, preventing generation of the pulse and providing a fault indication.

Figure 10:
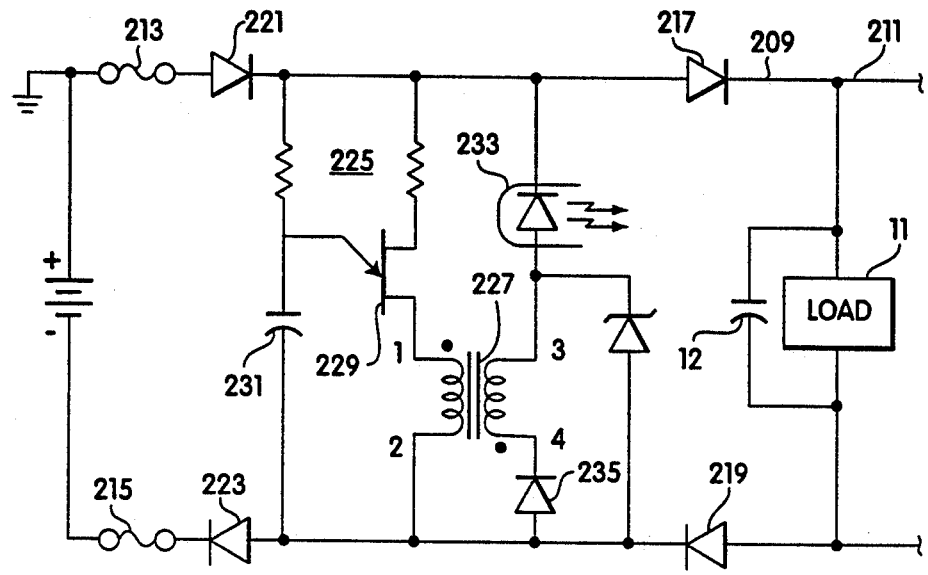
FIG. 10 is a schematic representation of yet another embodiment of a fault monitoring and detecting system according to the present invention incorporated into a portion of a redundant power system.

Another shunt implementation is illustrated in FIG. 10. FIG. 10 shows a shunt-connected implementation in which energy is stored in a two-winding inductor 227. FIG. 10 shows redundant buses 209 and 211 which provide redundant power to load 11. As with FIGS. 7 and 9, bus 209 includes fuses 213 and 215, and diodes 217, 219, 221 and 223. The configuration of FIG. 10 further includes a relaxation oscillator 225 configured and operating similarly to that of FIG. 5 except that resistor 87 and the output line of FIG. 5 are replaced by a two-winding inductor 227. In this configuration, UJT 229 drives pulse current from capacitor 231 through winding 1-2 of inductor 227. While UJT 229 is conducting, inductor 227 stores energy. When UJT 229 switches off, inductor 227 discharges into photoemitter 233 via monitored diode 217, capacitor 12, monitored diode 219 and diode 235. Thus, lack of a fault permits generation of a pulse from photoemitter 233, while a failure that opens any of components 217 and 219 prevents generation of that pulse.

Figure 11:
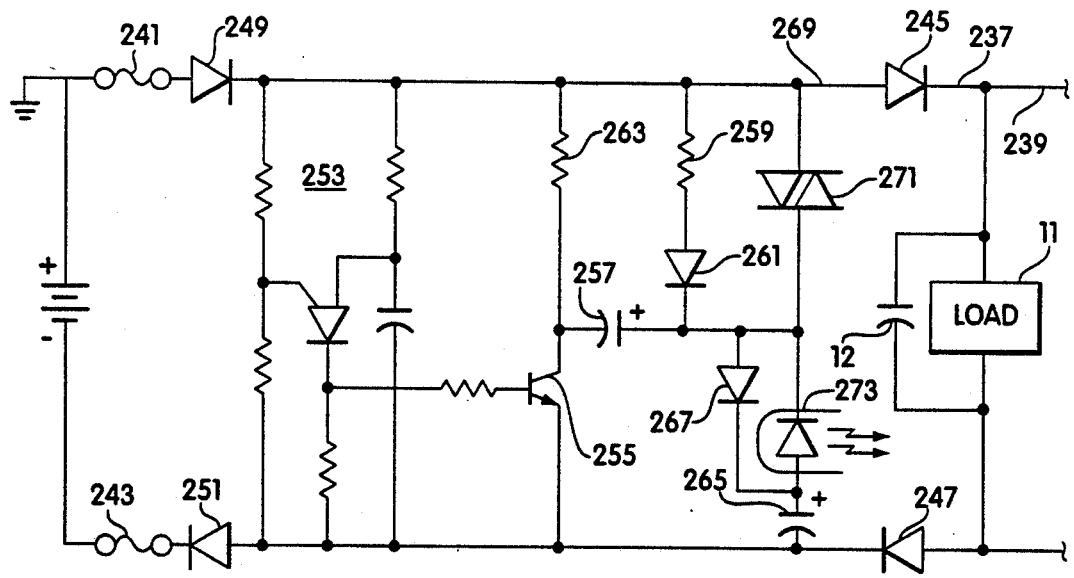
FIG. 11 is a schematic representation of a still further embodiment of a fault monitoring and detecting system according to the present invention incorporated into a portion of a redundant power system.

Capacitors may instead be used to provide energy storage for pulse generation. FIG. 11 shows a preferred capacitive stored-charge implementation, although others are possible as well. In FIG. 11, redundant buses 237 and 239 supply power to load 11. As with FIGS. 7, 9 and 10, bus 237 includes fuses 241 and 243, and diodes 245, 247, 249 and 251, all to be monitored. The apparatus of FIG. 11 further includes relaxation oscillator 253, configured and operating identically to the relaxation oscillator of FIG. 6. Trigger device 271 can be a bilateral switch or similar breakover device. Relaxation oscillator 253 operates to switch transistor 255 on and off. When transistor 255 is turned on, charge-transfer capacitor 257 charges through resistor 259 and diode 261, so that the right-hand plate of capacitor 257 thereby acquires a charge which is positive relative to the left plate of that capacitor. When transistor 255 is turned off, resistor 263 pulls the negative end of capacitor 257 in the positive direction, thereby transferring the charge contained in capacitor 257 to capacitor 265 via diode 267, which makes the upper plate of capacitor 265 more positive than the lower plate. As capacitor 265 continues to acquire charge, the upper plate of capacitor 265 eventually becomes more positive than the positive supply voltage on bus 237 side or rail 269 (measured, for example, at the anode of diode 245). At some point, the voltage across trigger device 271 exceeds its trigger point, thereby causing device 271 to change from its high-impedance state to a low-impedance state. That sudden change of state causes the charge stored in capacitor 265 to be suddenly dumped through the circuit path consisting of photoemitter 273, diode 245, bypass capacitor 12 and diode 247. As with FIG. 7, the signal from photoemitter 273 is provided to a photoreceptor (not shown) and thence to a one-shot (not shown). The rest of the operation of the apparatus of FIG. 11 proceeds in a similar manner as described above with respect to the operation of the configuration of FIG. 7. Pulses from phototransmitter 273 would prevent timing out of the one-shot. If one or more of diodes 245 and 247 fail open, then those pulses cannot be generated. If one or more of fuses 241 and 243 and diodes 249 and 251 fail open, then power is not provided to relaxation oscillator 253, also preventing generation of the pulses.

The foregoing descriptions of FIGS. 2-11 address implementations wherein the test circuits are connected in shunt with the load 11, that is between the positive and negative sides or rails of each power bus. FIG. 12 shows an alternative configuration in which a test circuit is connected in series with a fuse 279 and diodes 281, 283 to be monitored for latent faults. Still, the shunt configuration is preferred to the series configuration because the series configuration generally cannot distinguish between a non-fault condition and a failed test circuit.

Figure 12:
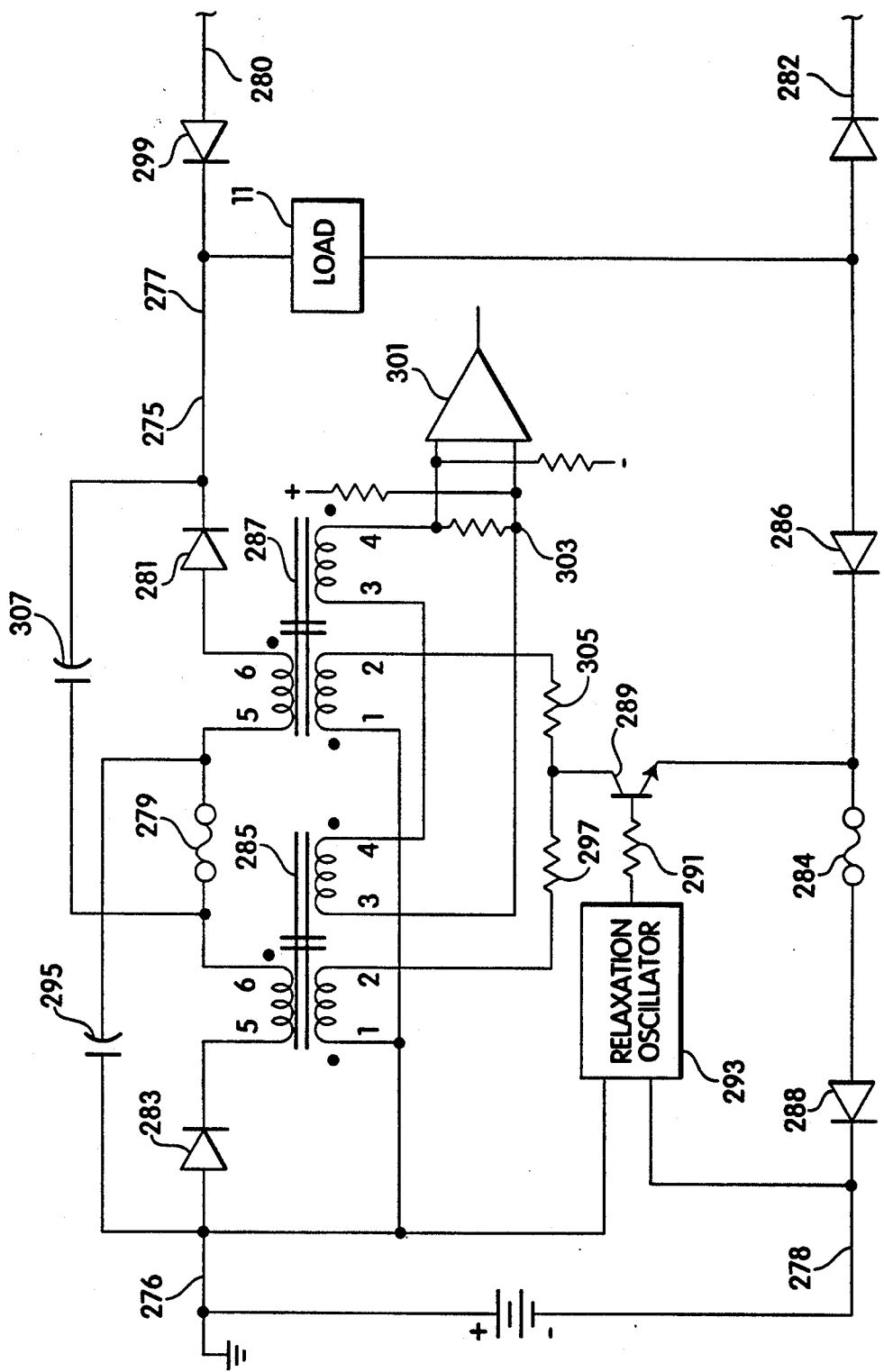
FIG. 12 is a schematic representation of yet a further embodiment of a fault detecting and monitoring system according to the present invention incorporated into a portion of a redundant power system.

As with FIGS. 7, 9, 10 and 11, in FIG. 12 redundant power buses 275 and 277 provide power to load 11. Unlike those previous figures, no bypass capacitor for load 11 is needed in FIG. 12. However, bypass capacitors 295 and 307 are now needed. Bus 275 includes a positive side or rail 276, and a negative side or rail 278. Likewise, bus 277 includes a positive side or rail 280, and a negative side or rail 282. Negative rail 278 of bus 275 includes fuse 284, and diodes 286 and 288. Positive rail 276 of bus 275 includes fuse 279 and isolation diodes 281 and 283, all to be monitored for latent faults. In FIG. 12, for simplicity of illustration, apparatus is shown for monitoring and testing of components 279, 281 and 283. However, it should be understood that corresponding such apparatus can be added to monitor and test components 284, 286 and 288 for latent faults.

Positive power is provided to load 11 via fuse 279 and isolation diodes 281 and 283. Also connected in series with fuse 279 and diodes 281 and 283 are the windings of transformers 285 and 287, which are both driven by transistor 289. Transistor 289, in turn, is switched on and off via resistor 291 by relaxation oscillator 293. The configuration and operation of relaxation oscillator 293 can, for example, be identical to that of the relaxation oscillator shown in FIG. 6, and be connected in shunt across bus 275. Transformer 285 and transformer 287 each have three windings. For each of transformer 285 and transformer 287, the primary winding is labeled 1-2, a secondary winding is labeled 3-4, and an test winding is labeled 5-6. Limiting resistor 297 is placed in series between transistor 289 and primary winding 1-2 of transformer 285 to prevent damage to transistor 289 from saturation of the transformer core. Transformer 285 is preferably constructed so that relatively tight coupling is achieved between its primary winding 1-2 and its test on winding 5-6, while the coupling between its primary and test windings and its secondary winding 3-4 is relatively loose.

While transistor 289 is "on" or conducting, current flows through the primary winding 1-2 of transformer 285. For the winding polarity (dots) indicated in FIG. 12, since the current flow makes terminal 1 more positive than terminal 2, terminal 6 of the interrogation winding becomes more positive than terminal 5. Any test impulse that is produced from terminal 6 of the test winding of transformer 285, would pass through fuse 279, bypass capacitor 295, diode 283, and back to the test winding of transformer 285 at its terminal 5. Whether or not an test pulse is generated depends upon whether direct current is flowing through bus 275 to load 11 since such current, if it exists, must also flow through the test winding of transformer 285. Such direct current flow through the test winding of 5-6 transformer 285 will keep the core of that transformer in saturation.

Three possible scenarios can occur while transistor 289 is turned on. In one such scenario, DC current flows through bus 275 to load 11, via diode 283, transformer 285 winding 5-6, fuse 279, and diode 281. In this first scenario, the core of transformer 285 is saturated, and current driven through its primary winding 1-2 develops no output pulse at its secondary winding 3-4 since most of the available voltage appears across resistor 297. In a second such scenario, the voltage across bus 277 is greater than the voltage across bus 275, so that the current passing through load 11 is provided by bus 277. For the second scenario, test pass from interrogation winding 5-6 of transformer 285 through fuse 279, bypass capacitor 295 and diode 283. The voltage drop around this test path is very small, and the effect is like that of a transformer having a short-circuited winding. In other words, most of the voltage available to be applied across the primary winding 1-2 of transformer 285 appears instead across resistor 297. Very little voltage appears across the secondary winding 3-4 of transformer 285. In a third scenario, one or both of fuse 279 and diode 283 has failed open, so that no path exists for test current out of the test on winding 5-6 of transformer 285. The full available voltage from bus 275 is then applied across the primary winding 1-2 of transformer 285, so that a similar voltage appears at the secondary winding 3-4 of that transformer and can be sensed by amplifier 301. Operation of amplifier 301 with resistor 303 and transformers 285 and 287 is similar to that of the device of FIG. 4. The output of amplifier 301 can then be monitored for a fault indication.

FIG. 12 also includes an additional transformer 287 and its limiting resistor 305. Transformer 287 and resistor 305 operate in a manner similar to that described above for transformer 285 and its limiting resistor 297. Thus, transformer 287 and resistor 305 cooperate with transistor 289 and bypass capacitor 307 to monitor and interrogate fuse 279 and diode 281 for faults. A pulse is emitted from the secondary winding 3-4 of transformer 287 if either or both of fuse 279 and diode 281 are open. Likewise, a pulse is emitted from the secondary winding 3-4 of transformer 285 if either or both of fuse 279 and diode 283 are open. As shown in FIG. 12, the respective secondary windings 3-4 of transformers 285 and 287 are connected in series, forming a logical sum that is examined by amplifier 301. If fuse 279 fails open, then the interrogation pulse from transformer 285 and the interrogation pulse from transformer 287 buck one another. Since those two pulses are equal in magnitude and oppositely polarized, the net voltage applied to the respective loops formed by each of the interrogation windings 5-6 of the two transformers 285, 287 is zero and no current flows through those test windings. Voltage pulses are therefore developed across the secondary windings 3-4 of both transformers 285 and 287, providing a fault indication at amplifier 301.

Some of the many advantages of the invention should now be readily apparent. For example, novel apparatus and a novel method have been provided which are capable of rapidly detecting the presence of latent faults in electrical systems, especially in redundant or fault tolerant systems such as redundant power systems. Apparatus and method has been provided for detecting open circuit faults in power-handling components connected in series between a DC power source and a load. Such apparatus and method has no effect on the power delivering properties of the components being tested, and can continue to test those components whether or not they are actively participating in the delivery of power to the load. Such apparatus and method is capable of being utilized in redundant power delivery systems. Such apparatus and method can provide fault signalling using circuit-closure (e.g., a phototransistor) or voltage-source (e.g., a transformer winding) topologies. For either such topology, the signalling source may be isolated to any desired degree from the circuit elements being tested. Such apparatus and method can provide redundant fault signalling, if desired. Furthermore, such apparatus and method, for operating power, utilizes voltages available in the circuits to be tested, and is relatively independent of the magnitudes of those voltages. In addition, such apparatus and method can indicate a fault if the test circuit itself fails.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. Apparatus for fault detection in an electrical system that includes a power source connected to at least one electrical component capable of failure, said apparatus comprising:

test signal generation means, connected to the electrical system to form an electrical circuit path including the at least one component, for generating a first signal and for applying the first signal to the path such that the first signal passes through the at least one component; and receiver means, connected to said test signal generation means via said path, for producing a second signal, indicative of whether the first signal is present in said path during a predetermined period of time, wherein failure of the at least one component prevents passage of the first signal on said path.

2. Apparatus as recited in claim 1 wherein said test signal generation means comprises a pulse generator.

3. Apparatus as recited in claim 2, further comprising:
a retriggerable multivibrator receiving the second signal and having a duration of operation equal to at least one pulse interval of said pulse generator.

4. Apparatus as recited in claim 1 wherein said receiver means comprises communication means for providing the second signal to a location where the second signal can be monitored.

5. Apparatus as recited in claim 4, wherein said communication means comprises an optical coupler converting the first signal to an optical signal and then reconverting the optical signal into the second signal representative of the first signal.

6. Apparatus as recited in claim 4, wherein said communication means comprises:
a transmitter responsive to the first signal for converting the first signal to a transmitted signal; and
a receiver responsive to the transmitted signal for converting the transmitted signal into the second signal representative of the first signal.

7. Apparatus as recited in claim 4 wherein said communication means comprises an electrical transformer.

8. Apparatus as recited in claim 1 wherein said test signal generation means comprises means connected to the electrical system for receiving power therefrom.

9. Apparatus as recited in claim 8 wherein said means for receiving power comprises a relaxation oscillator connected to the electrical system to receive current therefrom.

10. Apparatus as recited in claim 9 wherein said relaxation oscillator is adapted to be connected in shunt across at least a portion of the electrical system including the at least one electrical component.

11. Apparatus as recited in claim 1 wherein said test signal generation means comprises:
sensing means for sensing current flow in at least a portion of an electrical system, and for producing a sensing signal indicative of whether instantaneous current flow is present in the electrical system;
a first resistor connected to one side to receive the sensing signal;
a field effect transistor having a gate electrode connected to the other side of said first resistor and further having first and second electrodes;
a first zener diode connected between said gate electrode and said second electrode of said field effect transistor;
a second zener diode connected between said first electrode and said second electrode of said field effect transistor;
a capacitor connected to one side to said first electrode;
an inductor connected between said second electrode and the other side of said capacitor;
a diode connected between said first electrode and said receiver means; and a second resistor connected between said first electrode and said receiver means.

12. Apparatus as recited in claim 1 wherein said test signal generation means comprises:
sensing means for sensing current flow in at least a portion of an electrical system, and for producing a sensing signal indicative of whether instantaneous current flow is present in the electrical system;
a first resistor connected on one side to receive the sensing signal;
a field effect transistor having a gate electrode connected to the other side of said first resistor and having first and second electrodes;
a zener diode connected between said gate electrode and said second electrode of said field effect transistor;
a capacitor connected at one side to said first electrode of said field effect transistor;
an inductor connected between the other side of said capacitor and said second electrode of said field effect transistor;
a diode connected between said capacitor and said receiver means for providing the condition signal to said receiver means; and
a second resistor connected between said first electrode and said receiver means.

13. Apparatus as recited in claim 1 wherein said test signal generation means comprises:
sensing means for sensing current flow in at least a portion of an electrical system, and for producing a sensing signal indicative of whether instantaneous current flow is present in the electrical system;
a transformer having first, second and third windings, said first winding being connected to receive the sensing signal from said sensing means;
a transistor having a base electrode, an emitter electrode and a collector electrode, said transistor being connected at its base and emitter electrodes across said second winding of said transformer;
a second transistor having a base electrode, an emitter electrode and a collector electrode, said second transistor being connected at its base and emitter electrodes across said third winding of said transformer;
an inductor connected between said emitter electrode of said second transistor and said collector electrode of said first transistor;
a first diode connected between said emitter electrode of said first transistor and said emitter electrode of said second transistor;
a second diode connected between said collector electrode of said first transistor and said receiver means for providing a condition signal to said receiver means; and
a zener diode connected between said emitter electrode of said second transistor and the input of said receiver means;
wherein said collector electrode of said second transistor is connected to said receiver means.

14. Apparatus as recited in claim 1 wherein said test signal generation means comprises:
sensing means for sensing current flow in at least a portion of an electrical system, and for producing a sensing signal indicative of whether instantaneous current flow is present in the electrical system;
a transformer having at least first and second windings, said first winding being connected to receive the sensing signal;

a diode connected on one side to one side of said second winding; and a zener diode connected between the other side of said second winding and the other side of said diode;

wherein said other side of said second winding is connected to said receiver means to provide a condition signal thereto.

15. Apparatus as recited in claim 1 wherein said test signal generation means comprises:

sensing means for sensing current flow in at least a portion of an electrical system, and for producing a sensing signal indicative of whether instantaneous current flow is present in the electrical system;

a first resistor connected at one side to receive the sensing signal;

a transistor having a base electrode, an emitter electrode and a collector electrode, said gate electrode being connected to the other side of said first resistor;

a capacitor connected at one side to said collector electrode;

a second resistor connected at one side to said collector electrode;

a trigger device connected between the other side of said capacitor and the other side of said second resistor;

a first diode connected at one side to the other side of said capacitor;

a third resistor connected between the other side of said first diode and the other side of said second resistor;

a second diode connected between the other side of said capacitor and an input to said receiver means, said second diode being connected across said receiver means; and a second capacitor connected between the input of said receiver means and said emitter electrode.

16. Apparatus as recited in claim 1 wherein said test signal generation means comprises:

sensing means for sensing current flow in at least a portion of an electrical system, and for producing a sensing signal indicative of whether instantaneous current flow is present in the electrical system;

a first transformer including at least first, second and third windings;

a second transformer including at least first, second and third windings, wherein one side of said first winding of said first transformer is connected to one side of said first winding of said second transformer and wherein one side of said second winding of said first transformer is connected to one side of said second winding of said second transformer and wherein the other side of said second winding of said first transformer and the other side of said second winding of said second transformer together produce a condition signal;

a first resistor connected on one side to receive the sensing signal;

a transistor having a base electrode, an emitter electrode and a collector electrode, wherein said base electrode is connected to the other side of said first resistor;

a second resistor connected between said collector electrode and the other side of said first winding of said first transformer; and a third resistor connected between said collector and the other side of said first winding of said second transformer;

said third windings each being adapted to be connected in series with the electrical system.

17. Apparatus for providing electrical power to a load, comprising:

a voltage source;

a bus connected to said voltage source and adapted to be connected across the load;

at least one electrical component incorporated into said bus and capable of failure resulting in an inoperable condition;

sensing means for sensing presence of instantaneous current flow in said bus and for producing a sensing signal indicative thereof;

first signal generating means, responsive to the sensing signal and connected to said bus, for generating a test signal on a circuit path through at least a portion of said bus including said at least one electrical component; and second signal generating means, connected to said circuit path and responsive to whether the test signal is present on said circuit path during a predetermined period of time, for producing a condition signal, indicative of whether said electrical system is operating properly.

18. An electrical system as recited in claim 17 wherein said sensing means comprises a relaxation oscillator connected in shunt across said bus.

19. An electrical system as recited in claim 17 wherein:

said first signal generating means is connected in series with said second signal generating means;

and said first signal generating means and said second signal generating means are together connected in shunt across said bus.

20. An electrical system as recited in claim 17 wherein said first signal generating means is connected in series with said bus.

21. Apparatus for detecting failure of an electrical component connected in an electrical circuit, said apparatus comprising:

test signal generation means connected to said electrical circuit, for generating a test signal; and receiver means, responsive to said test signal, for generating a no fault signal, said receiver means connected to said electrical circuit, said test signal generation means and said receiver means being connected in a closed circuit path including said electrical component so that said test signal travels from said test signal generation means around said circuit path through said electrical component to said receiver means.

22. Apparatus for detecting failure of an electrical component according to claim 21 wherein said electrical circuit includes a power supply and said test signal generation means draws electrical power from said power supply so that an interruption in said electrical circuit between said power supply and said test signal generation means causes said interrogation means to stop generating said test signal generation signal.

23. Apparatus for detecting failure of an electrical component according to claim 21 wherein said test signal generation signal is a pulse and said test signal generation means comprises means for periodically generating said test signal generation signal.

24. Apparatus for detecting failure of an electrical component connected in an electrical circuit between a power source and a load, said apparatus comprising:
a pulse generator connected to said electrical circuit between said power source and said electrical component, said pulse generator periodically generating test pulses; and
pulse receiver means responsive to each of said test pulses for generating a no fault signal, said pulse receiver means connected to said electrical circuit between said load and said power source, so that said test pulses travel from said pulse generator through said electrical component to said pulse receiver means.

25. Apparatus for detecting failure of an electrical component according to claim 24 further comprising means for preventing said test pulses from passing through said power source.

26. Apparatus for detecting failure of an electrical component according to claim 24 wherein said pulse generator comprises means for periodically generating current pulses.

27. Apparatus for detecting failure of an electrical component according to claim 24 further comprising means for shunting said test pulses around said load.

28. A method for fault detection in an electrical system that includes a power source connected to at least one electrical component capable of failure, said method comprising the steps of:
generating a first signal and applying the first signal to an electrical circuit path that includes the at least one electrical component such that the first signal passes through the at least one electrical component; and
producing a second signal, indicative of whether the first signal is present in the path during a predetermined period of time,
wherein failure of the at least one component prevents presence of the first signal in the path.

29. A method as recited in claim 28 wherein said passing step comprises:
drawing power from the electrical system; and
passing a pulse, as the first signal, through the at least one component via the path.

30. A method as recited in claim 28 wherein the step of generating a first signal comprises:
sensing current flow in at least a portion of the electrical system;
producing, responsive to the step of sensing, the first signal indicative of whether instantaneous current flow is present in the electrical system and is being sensed in the step of sensing.

31. A method as recited in claim 28 wherein said producing step comprises providing the second signal to a location wherein the second signal can be monitored.

32. A method for detecting failure of an electrical component connected in an electrical circuit, said method comprising the steps of:
generating a test signal;
applying the generated test signal to a closed electrical path including said electrical component so that said test signal travels around said electrical path through said electrical component; and
responsive to a success of said applying of said test signal, generating a no fault signal.

33. A method for detecting failure of an electrical component according to claim 32 wherein said test signal is a pulse and said generating step comprises periodically generating said pulse.

34. A method for detecting failure of an electrical component connected in an electrical circuit between a power source and a load, said method comprising the steps of:
generating test pulses;
applying said generated test pulses through said electrical component; and
responsive to each of said test pulses, generating a no fault signal.

35. A method for detecting failure of an electrical component according to claim 34 wherein said generating step comprises periodically generating current pulses.

36. A system for detecting an open circuit condition created by failure of an electrical component in an electrical circuit which is not conducting power, comprising:
a pulse generator connected to the electrical circuit and which applies a pulse signal to the circuit on one side of the electrical component; and
a detector connected to the electrical circuit on another side of the electrical component and which provides a detection signal indicative of a detection of the pulse signal, wherein the pulse signal is not detected when the electrical component has failed.

* * * * *